United States Patent [19]

Le Gac et al.

[11] Patent Number: 4,726,996
[45] Date of Patent: Feb. 23, 1988

[54] PHENOLIC RESIN BASED LAMINATE MATERIALS AND PROCEDURE FOR THEIR PREPARATION

[75] Inventors: Francois Le Gac, Boissise-le-Roi; Pierre Chevalier, Descartes, both of France

[73] Assignee: Everitube, c/o Saint-Gobain Recherche, Aubervilliers, France

[21] Appl. No.: 801,871

[22] Filed: Nov. 26, 1985

[30] Foreign Application Priority Data

Nov. 27, 1984 [FR] France ................................ 84 18023

[51] Int. Cl.$^4$ ...................... B32B 27/08; B32B 27/36; B32B 27/40; B05D 3/02
[52] U.S. Cl. .............................. 428/425.3; 427/385.5; 427/393.5; 427/407.1; 428/480; 428/482; 428/524
[58] Field of Search ................................ 428/480–483, 428/460; 525/31, 36; 264/272.15; 427/385.5, 407.1, 393.5

[56] References Cited

U.S. PATENT DOCUMENTS

| | | | |
|---|---|---|---|
| 4,005,244 | 1/1977 | Wismer et al. | 428/480 |
| 4,038,339 | 7/1977 | Foster | 525/31 X |
| 4,107,451 | 8/1978 | Smith, Jr. et al. | 264/272.15 X |
| 4,173,594 | 11/1979 | Dyszewski | 428/460 X |
| 4,246,367 | 1/1981 | Curtis, Jr. | 428/482 X |

*Primary Examiner*—Thomas J. Herbert
*Attorney, Agent, or Firm*—Oblon, Fisher, Spivak, McClelland & Maier

[57] ABSTRACT

A phenolic resin based laminate material which can be cross-linked by acid catalysis, endowed with a reinforcement, comprising at least two surfaces and having on at least one of its two surfaces at least one additional nonphenolic resin-based layer is disclosed.

In accordance with the invention, the additional layer in contact with the phenolic resin is obtained from a formula comprising an unsaturated polyester resin, a cross-linking solvent of said resin, possibly one or several other additives, at least one of the main components having a formula comprising hydrophilic centers in a number at least equal to the number of non-saturation centers in the polymeric chain of the resin.

12 Claims, No Drawings

PHENOLIC RESIN BASED LAMINATE MATERIALS AND PROCEDURE FOR THEIR PREPARATION

BACKGROUND OF THE INVENTION

1. Field of the Invention

This invention relates to phenolic resin based laminate materials endowed with a reinforcement. It also relates to a process for making these laminate materials.

2. Discussion of the Background

Laminated materials are materials having several successive alternating layers or strata of resin which can be thermohardened, whether reinforced or not. Such materials find various applications, notably in construction. They may be used as cladding panel elements, replacing sheet metals which are susceptible to oxidation.

There are known preparations for reinforced phenolic resin based laminated materials. The most widely used phenolic resin is a resol i.e., a resin which can be thermo-hardened, and is obtained by condensation of phenol and formaldehyde (with an excess of formaldehyde) in a basic medium. The hardening of the resin thus prepared, i.e. its cross-linking in a three-dimensional network, is effected by condensation polymerization through the use of an acid catalyst. For example, chlorhydric, sulfuric, phosphoric, oxalic acid, or an aren-sulfonic acid such as benzene sulfonic, phenol sulfonic acid, etc . . . may be used.

Generally a reinforcement in the form of fibers is used, such as cellulose fibers or glass fibers. A reinforcement in non-woven form, for example, a reinforcement of high molecular weight polyester, or a polyvinyl chloride is also possible. Alternatively the reinforcement may be in a fiberglass mat or in a woven form. For example, a reinforcement made of aromatic polyamide, glass or asbestos.

Phenolic resin based laminate materials are sought particularly for their excellent tolerance to fire. But it is equally appropriate that they have the proper surface characteristics, namely, a smooth and homogeneous aspect which does not change over time.

The aspect properties of laminated materials in general and more specifically reinforced phenolic resin based laminated materials are closely related to the process by which they are prepared. Various procedures are known for the preparation of these materials, but up to the present the surfaces of the materials prepared have not had the desired smooth and homogeneous aspect.

According to one procedure, a textile or non-textile that is a woven or non-woven reinforcement is impregnated with resin. The impregnation is finished either by roller or by press and several layers of the impregnated reinforcement are put together. According to a variation of this process, the laminate material is prepared by rolling a resin-impregnated fiber.

According to another procedure, a reinforcement in the form of fibers is projected on a layer of resin on the surface of a mold. The depositing of resin and fibers is repeated as many times as necessary to obtain the desired thickness.

It has been noted that the surface of the materials produced according to these processes is not smooth. Tiny pits form and the fibers mark the surface, leaving their imprints. In addition, the phenomena tend to become aggravated due to aging under the effects of erosion, heat and light. The color of the material changes to dark brown and micro-cracks, crackling and exposure of the fibers occurs after a few months. If one attempts to cover up these defects by directly applying a coating such as a polyurethane bonding material based paint to the materials to form a finishing layer, the material obtained still presents an unaccetably poor surface. The only way to obtain a smooth surface is by applying a pore sealing product such as a polyurethane resin to the laminate material and by sanding the resultant surface before painting it. This involves time-consuming operations.

According to another process, molded articles made of phenolic resin are produced by depositing or projecting, on the surface of a mold, a layer of a synthetic resin-based compound. This compound is allowed to harden at least partially before one or several layers of reinforced resin are deposited on it, according to one of the aforementioned processes. This layer deposited on the mold is currently called gel-coat. According to another variation of this "gel-coat" technique, the gel-coat is deposited or projected on a continuously fed cellulose or thermoplastic film. The resin is deposited on top and covered before it has hardened with another film made of cellulose or another material. This is also covered with a gel-coat; the laminate product being shaped continuously while it hardens. This procedure is particularly adapted to the preparation of thin laminate materials of about 1 millimeter.

The gel-coat technique was developed essentially for the preparation of reinforced resin-based polyester laminate materials for which the gel-coat itself is a polyester resin based coating and the results obtained are satisfactory. It was then attempted to apply this technique to the preparation of reinforced phenolic resin based laminate materials utilizing a phenolic resin-based gel-coat. But the same undesirable phenomena as those described in relation with the preceding processes appeared. With a relatively thin gel-coat, the surface of the material has micropits and fiber imprints. Microprints and fiber imprints can be eliminated by depositing a phenolic resin-based gel-coat in the form of a thicker coating, but, in this case, micro-cracks a crackling occurs.

Thus, one sought to apply unsaturated polyester resin based gel coats to phenolic laminate products to promote proper tolerance to aging of the hardened polyester resins. But conventional formulas for the unsaturated polyester resin-based gel-coats are not compatible with phenolic resins.

To make the two resins compatible, it was proposed, for example, in the publication of French Pat. No. FR 2 331 587, to place a sprinkling of boronic derivatives between a polyester resin gel-coat and the phenolic resin. However, on the one hand, adherence is not entirely satisfactory with this method. And on the other hand, effecting a fine and regular sprinkling is a delicate operation.

It was also proposed, in the publication of French Pat. No. FR 2 447 275, to utilize a furanic resin based gel-coat. But such a gel-coat decomposes over time, thus requiring the application of an additional coating of paint.

It was also proposed to place a furanic resin based gel coat between a polyester resin based gel-coat, serving as the aspect or finishing layer, and the phenolic resin. But furfural, from which furanic resin is derived, has the tendency to migrate into the external polyester resin-based layer. This phenomena provide the desired adhesion between the resins, but still requires the placement of two additional layers on the phenolic laminate.

Accordingly there is a strongly felt need for a phenolic resin-based laminate material possessing smooth and homogeneous surfaces. The surface of these laminate materials should not change upon exposure to light, develop micro-cracks, crackling and exposure of the underlying fiber after time. Such a laminate material should also be facile to prepare.

SUMMARY OF THE INVENTION

Accordingly, it is an object of this invention to provide a phenolic resin-based laminate material possessing a smooth surface.

It is another object of this invention to provide a phenolic resin-based laminate material possessing a homogeneous surface.

It is another object of this invention to provide a phenolic resin-based laminate material which does not suffer from tiny pit formation on the surface.

It is another object of this invention to provide a phenolic resin-based laminate material in which the surface does not suffer erosion upon exposure to heat or light.

It is another object of this invention to provide a phenolic resin-based laminate material in which the surface does not change color upon exposure to heat or light.

It is another object of this invention to provide a phenolic resin-based laminate material in which micro-cracks are not formed on the surface.

It is another object of this invention to provide a phenolic resin-based laminate material in which crackling does not form on the surface.

It is another object of this invention to provide a phenolic resin-based laminate material in which the fibers do not become exposed on the surface after time.

It is another object of this invention to provide a phenolic resin-based laminate material in which the additional layers can be very thin while nonetheless retaining the desired properties; good tolerance to fire, good resistance to aging, good superficial hardness and a smooth surface.

This invention has as an object providing phenolic resin based laminate materials which can be cross-linked by acid catalysis, endowed with a reinforcement, and having at least two surfaces. On at least one of their surfaces, these laminate materials have at least one additional non-phenolic resin based layer. And these laminate materials present none of the aforementioned drawbacks. More specifically, the invention provides such a laminate material for which the additional layer(s) can be as thin as about 1/10th of a millimeter, and which nonetheless retain the desired properties, i.e., good tolerance to fire (classification M1 on the epiradiator), a sound resistance to aging, good superficial hardness and a smooth surface.

The inventors have now surprisingly discovered a novel phenolic resin-based laminate material which satisfies all of the above objects of this invention. This phenolic resin-based laminate material which can be cross-linked by acid catalysis and endowed with a reinforcement, comprises at least two surfaces. It has on at least one of the surfaces at least one additional layer which is non-phenolic resin based. This phenolic resin based laminate material is characterized in that the additional layer in contact with the phenolic resin is obtained from a formula including an unsaturated polyester resin, a cross-linking solvent for the resin, and possibly one or several other additives. At least one of the components of the formula possesses a hydrophilic center in a number which is at least equal to the number of unsaturation centers of the polymeric chain of the polyester resin.

DETAILED DESCRIPTION OF THE PREFERRED EMBODIMENTS

Conforming to the invention, the laminate material is such that the supplementary layer in contact with the phenolic resin is obtained from a formula comprising an unsaturated polyester resin in solution, and possibly one or several other additives. At least one of the main components of the formula resin or cross-linking solvent) has hydrophilic centers which are at least equal in number to the unsaturation centers of the polymeric chain of the polyester resin.

The hydrophilic centers of the formula which is intended to form a layer of laminate material directly in contact with the phenolic resin can be derived from various sources. They can, for example, come from the polymeric chain of polyester resin, i.e., the product of the condensation reaction of a diacid and a diol which produces a polyester prepolymer.

The hydrophilic centers can also come from a crosslink solvent of the resin. Polyester resins are normally in styrene solution. Preferably, according to the invention, the styrene is at least partially replaced by methyl methacrylate, for example. However, it has been noted that, to facilitate the production of the laminate according to the gel-coat technique, it was preferable to utilize a formula in which the hydrophilic centers came from the polymeric chain itself.

As has been indicated above, the polyester resins are obtained through the condensation of a polyol and a diacid. The hydrophilic centers can be borne by the main chain or a side chain of at least one of the components, polyol or diacid, or reactants intervening when the resin is produced. The number of hydrophilic centers must always be at least as great as the number of unsaturation centers of the prepolymer, i.e. the uncrosslinked resin.

Among all of the unsaturated polyester resins thus defined, one can, for example, cite polyesters obtained from bisphenol A and acrylic acid. These unsaturated polyester resins have the general formula (1):

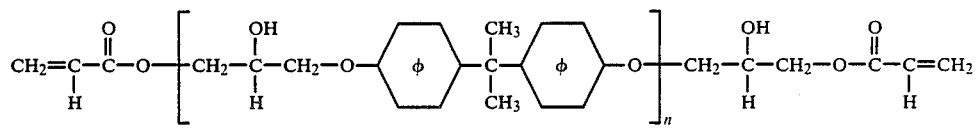

where n=1 or n=2, i.e. a vinylester resin.

Advantageously, in all cases, hydroxyl or carboxyl groups will be chosen as hydrophilic groups, which permit the resin solution to be in transparent color. Through the addition of the appropriate colorants, it is then easy to obtain a colored formulation when appropriate and thus to give the laminate material the color which is sought. For this aspect of the invention, laminate materials whose visible surfaces can have any color desired are obtained.

Without departing from the framework of the invention, different additives can be combined with the polyester resin before hardening: mineral filler, extending agent, solvent, thixotrope, accelerators, pigments.

So that the laminate material according to the invention even better resists aging, one can advantageously prepare a laminated material with an additional finishing laminate on the surface, comprised of a gel-coat with a resin base which guarantees an even better esthetic aspect for the laminate material. Such a resin can, for example, be an unsaturated resin of the usual formula, for example, an ethyleneglycol and iso- or orthophthalic acid based resin, or else a bisphenol A and fumaric acid based resin, cross-linked with styrene. This can also be a polyurethane-type resin.

Thus, in another of its aspects, the invention provides a phenolic resin based laminate which can be cross-linked by acid catalysis, endowed with a reinforcement, having, on at least one of its surfaces a layer of a compound comprising a polyester resin in solution, such as described above, and a finishing layer which has another resin as a base, which is not compatible with the phenolic resins.

In the sense of the invention, "finishing layer" means a layer or stratum which constitutes the visible layer of the material on either of its surfaces. According to the embodiments of the invention, the finishing layer is thus either a stratum obtained from a formula comprising a polyester resin in solution and having hydrophilic centers, or a stratum obtained from a formula comprising a resin which is not compatible with the phenolic resins.

The invention also pertains to the preparation of phenolic resin based laminate materials such as described above.

According to the invention, in accordance with the gel-coat technique, that is, applying a formula such as defined above to the surface(s) of the mold, next, alternate, successive layers of phenolic resin and reinforcement are deposited.

The mold can be advantageously replaced by a single support film, such as a cellulose or polyethyleneterephthalate, continuously feeding. Then, at the end of the operation, the film must be removed from the laminate material. In the sense of the invention, "film removal" means the removal of the film support, or the separation of the laminate material from the support film. This process allows the continuous preparation of thin laminate materials.

The layering of phenolic resin and reinforcement is obtained, in a known manner, by cold or hot press contact or by injection, or else by filament winding.

The process of preparing phenolic resin based laminate materials endowed with a reinforcement comprises, in its preferred form, of applying, to a continuously feeding support film so as to form a layer, a formula comprising an unsaturated polyester resin such as defined above, i.e. having hydrophilic sites in a number which is at least as great as that of the unsaturated points of the polymeric chain of the resin. Then, after at least partial hardening, to form a layering of phenolic resin and reinforcement on said layer and, after oven hardening, removal of the film from the laminate material which is produced.

According to this preferred mode of preparation, the formula is applied manually or with the use of a gun to the support, as in the case of a preparation using a mold, or with a doctor blade, to form a layer of the desired thickness, which can be as thin as about one tenth of a millimeter.

In the case in which a laminate material is prepared, in which the visible external layer is not the unsaturated polyester resin layer defined according to the invention, but rather a layer which ensures an esthetic function in a known manner, but which is not compatible with the phenolic resins, such as polyester resins of the conventional formula, or polyurethane resins, one proceeds in the following manner. On a support film or on a mold, an initial layer of thermohardening polyester resin of the conventional formula is deposited, appropriately supplemented and/or pigmented, blended with a hardening catalyst. This initial layer is allowed to harden at least partially. Next, as indicated above, a second layer is deposited, this layer being a polyester resin based as defined in accordance with the invention. It is allowed to harden at least partially, then a laminate is formed on said second layer, using phenolic resin and reinforcement. The phenolic resin is allowed to harden and the film is removed from the laminate material obtained.

Preferably, the hardening of the phenolic resin is effected at about 85° C. to 105° C., most preferably at about 95° C.

Other features of the invention will become apparent in the course of the following descriptions of exemplary embodiments which are given for illustration of the invention and are not intended to be limiting thereof.

To better describe the advantages of the invention, a comparison has been established between the properties of laminates in accordance with the invention and laminates in which the the coating formed directly on the phenolic laminate according to the gel-coat technique, has a polyester resin base obtained from bisphenol A and fumaric acid, or else a polyurethane resin base.

The comparison of the examples (examples 1 to 5) according to the invention and the examples outside of the framework of the invention (examples 6 to 8) will be effected by comparing the respective properties of adherence of the coating in contact with the phenolic laminate. These properties imply the compatibility between said coating and the phenolic resin contained in the laminate, and the aging of the laminates obtained.

Examples 1 to 5 are examples according to the invention, which show the adherence properties of the finishing layers to the phenolic laminate compared to examples 6 to 8, which are outside of the framework of the invention.

In the examples, the compositions of the formulas used are given. Certain constituents of the formulas will not be given in detail in the description because one skilled in this art clearly knows how to adapt them to each formulation. These are specifically the film formation agents, the flame retardant agents, the accelerators. Only the percentage weight with respect to total weight of the formula will be given.

EXAMPLE 1

A laminate material is prepared according to the invention, in the following manner: A formula intended to constitute a finishing layer for the laminate material is applied to a cellulose support film brought to a temperature of 60 degrees C. The formula is applied in a thickness of about 0.08 mm and it comprises the following components, expressed in percentage weight with respect to the total formula weight:

| | |
|---|---|
| vinylester resin, marketed by the SHEBY company | 81.87% |
| colored material, containing pigments mixed with a butyl phthalate polyester resin | 12.45% |
| accelerators | 1.60% |
| film formation agents | 2.30% |
| catalysts | 1.78% |

The layer is allowed to harden partially for 1 minute at 70° C., then, on this partially hardened layer, the phenolic laminate is formed by contact, by depositing glass and phenolic resin fibers. It is heated lightly to properly impregnate the glass fibers. The glass fibers utilized are 50 mm long, dosed at about 600 g/m$^2$, such as the fibers marketed by the VETROTEX company under the name of Roving P 223. The phenolic resin is a resin mixed with its cross-link catalyzing acid and marketed by the SHEBY company under the brand name of Uralam.

After the laminate is formed and while it is still only partially hardened, it is covered with a second cellulose support film to which has also been applied a formula identical to the first, to form a second finishing layer. This formula is placed in contact with the laminate phenolic resin, while the phenolic resin and the formula itself are only partially hardened.

The product is next calendered to a thickness of 1.45 mm, then oven hardened as long as necessary at 95° C. To obtain a ready-to-use laminate, the support films must next be removed. The support film removal operation is effected while the laminate is at a temperature of about 60° C.

With the gel-coats described in the example, i.e. essentially vinylester based, the film removal is easy when it is hot, regardless of the formation conditions: the gel coat remains adherent to the laminate.

Moreover, external exposure tests were conducted in order to study the changes in the laminate during use in construction. The sample surface exposed became matte after one year, but after 3 years of exposure, there were no notable further changes in color. The essential is that it maintain its color.

EXAMPLE 2

According to the same procedure described in example 1, a laminate comprising different superimposed layers is prepared.

An initial gel-coat is deposited on the support film, with a thickness of about 0.08 mm, its composition being the following:

| | |
|---|---|
| isophthalic polyester resin | 79.5% |
| pigments | 17.77% |
| film formation agents | 0.88% |
| catalysts | 1.78% |
| accelerators | 0.07% |

This initial layer is allowed to harden partially, then a second gel-coat is applied, with a thickness of 0.05 mm, its composition being the following:

| | |
|---|---|
| vinylester resin | 94.32% |
| film formation agents | 2.24% |
| catalysts | 1.90% |
| accelerators | 1.52% |

This second layer is allowed to harden partially, then, the phenolic laminate itself is formed in alternate layers of glass fibers and phenolic resin; the laminate is obtained by the placement of a second support film, on which a double gel-coat has also been deposited. The laminate thus formed is next calendered at a 1.45 mm thickness, then oven-hardened at 95° C.

Hot film removal occurs very easily.

After 3 years of outside exposure, the surface of the material was still shiny and no significant changes in color were noted.

EXAMPLE 3

The same procedure as in the previous example is followed, but the formula of the first gel-coat deposited, serving as the finishing layer is changed. Its composition is as follows:

| | |
|---|---|
| polyurethane resin (product marketed by the SORITEC company under the name D 146) | 75.8% |
| catalysts | 22.7% |
| accelerators | 1.5% |

It is deposited at a thickness from 0.04 mm to 0.05 mm. It is allowed to harden about 2 minutes before applying the second gel coat, whose composition is identical to that indicated in relation to example 2, at a thickness of 0.05 m. The phenolic laminate is formed; two identical layers are formed on the other surface and it is calendered at a thickness of 1.45 mm. The film is removed from the laminate hot without any signs of surface detachment.

After 3 years of outside exposure, the surface of the material was still shiny and no notable changes in color occurred. Thus, resistance to aging was improved by forming a second gel coat.

EXAMPLE 4

One proceeds as in the previous example with a double gelcoat on both of the surfaces of a phenolic laminate. The gel-coat which comprises the most outer layer of the laminate, i.e. the finishing layer, is obtained from the following formula:

| | |
|---|---|
| isophthalic polyester resin | 52.85% |
| polyester resin marketed under the name 511LL by the RHONE POULENIC company | 26.65% |
| pigment | 17.70% |
| film formation agents | 0.88% |
| catalysts | 1.78% |
| accelerators | 0.07% |

The gel-coat which is in contact on the one hand with the phenolic laminate and on the other hand with the external finishing layer, is obtained from the following formula:

| | |
|---|---|
| vinylester resin | 81.65% |
| film formation elements | 0.78% |
| flame retardant agents | 15.56% |
| catalysts | 1.56% |
| accelerators | 0.56% |

Through the use of such a formula, which comprises a certain quantity of flame retardant agents, one obtains laminates possessing better resistance to fire, corresponding to epiradiator classification M1.

EXAMPLE 5

In this example, a gel-coat formula is used in which the hydrophilic groups are represented not by polyester resin, the essential component of the formula, but by an additional solvent, methyl methacrylate, which carries the carboxyl groups. The composition of the formula is as follows:

| | |
|---|---|
| isophthalic polyester resin, with 40% styrene | 14.33% |
| orthophthalic polyester resin with 28% styrene and 12% methyl methacrylate | 65.77% |
| methyl methecrylate | 14.30% |
| film formation agents | 2.83% |
| catalysts | 2.62% |
| accelerators | 0.25% |

The gel coat is deposited at a thickness of 0.08 mm on both surfaces of the laminate at a total thickness of 1.45 mm.

To obtain a satisfactory film removal and thus a good adherence of the gel-coat to the laminate, the hardening time for the gel-coat before the formation of the phenolic laminate must be very carefully determined. When it has hardened too much, the gel-coat is pulled away locally during hot film removal, when it issues from the machine.

This example shows that it is more difficult to obtain satisfactory results when the hydrophilic groups are provided by a cross-link solvent than when they are provided by the polyester resin itself. But, by operating under more precise conditions, the desired result is nonetheless obtained, namely, a compatibility between gel-coat and resin as well as good surface properties.

The following examples are outside of the framework of the invention and are described as comparative examples.

EXAMPLE 6

Still following the same procedure, a phenolic laminate is formed, with a gel-coat on each of its surfaces, having a thickness of 0.08 mm and the following composition:

| | |
|---|---|
| isophthalic polyester | 79.5% |
| pigments | 17.77% |
| film formation elements | 0.88% |
| catalysts | 1.78% |
| accelerators | 0.07% |

With the stratification completed, the laminate material is calendered to a desired thickness of 1.45 mm before oven hardening at 95° C.

The film removal for such a laminate is not complete: the gel-coat tends to remain on the cellulose film during hot film removal and even during a film removal after cooling, if the phenolic laminate is deposited on a gel-coat which has already hardened.

This example shows the importance of the nature of the gel-coat in its compatibility with the phenolic laminate.

EXAMPLE 7

The same type of gel-coat formula is utilized as in the preceding example, but with the incorporation of flame retardant agents, to increase the fire-resistant properties of the resulting material. The formulation applied is as follows:

| | |
|---|---|
| polyester resin | 72.95% |
| pigments | 15.31% |
| film formation agents | 0.86% |
| flame retardant agents | 8.11% |
| catalysts | 2.7% |
| accelerators | 0.07% |

During hot film removal, localized detachments are noted, which demonstrate the difficulties in the adherence of the gelcoat to the laminate. When cold film removal is effected, the gelcoat seems to adhere for a certain amount of time, but tests conducted in boiling water have shown that, after 3 hours in the boiling water, crackling occurs in the gel-coat, which renders it unsuitable for the desired usage.

This example demonstrates that the incorporation of flame retardant agents does not influence the compatibility between the gel-coat and the phenolic resin in a desired sense of the reinforcement of said compatibility.

EXAMPLE 8

In this example, the gel-coat which is formed is obtained from the formula which essentially has a polyurethane resin base such as indicated in relation to example 3. The composition is as follows:

| | |
|---|---|
| polyurethane resin | 75.8% |
| catalysts | 22.7% |
| accelerators | 1.5% |

The results obtained in this case are highly unsatisfactory: even by waiting several minutes after the gel-coat is deposited for the formation of the phenolic laminate, foam forms at the interface between the gel-coat and the laminate, causing a highly insufficient adherence.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reinforced laminate material having several successive alternating layers of a reinforcement and of a phenolic resin which can be cross-linked by an acid catalyst, comprising at least two surfaces one of which has at least one additional layer which is non-phenolic resin based, wherein said additional layer in contact with said reinforced phenolic resin is obtained from a composition comprising an ethylenically unsaturated polyester resin and a cross-linking solvent of said resin, wherein at least one of the components of said composition bears hydrophilic sites in a number which is at least equal to the number of unsaturation sites of the polymeric chain of the polyester resin, said additional layer being formed by the gel-coat technique and said hydrophilic sites being hydroxyl or carboxyl groups carried on the main chain of at least one polyol or diacid reactant for the formation of the polyester resin.

2. The reinforced laminate material of claim 1, wherein the polyester resin is a vinyl ester of the formula:

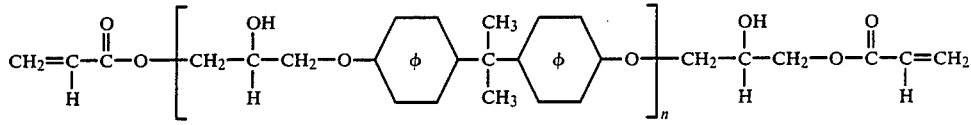

3. The laminate material of claim 1, wherein the said hydrophilic centers of the formula comprising a polyester resin come from the polyester resin itself.

4. The laminate material of claim 1, wherein the said hydrophilic centers of the formula comprising a polyester resin come from a solvent of the polyester resin.

5. The laminate material of claim 4, wherein the said solvent of the polyester resin is methyl methacrylate.

6. The reinforced laminate material of claim 1, wherein the said reinforced laminate material has, on at least one of its surfaces, in addition to a supplementary layer in contact with the phenolic resin, a finishing layer which is not compatible with the phenolic resins.

7. The laminate material of claim 6, wherein the finishing layer is a polyester-based layer and having no hydrophilic centers in a number at least equal to the number of unsaturation centers of the polymeric chain of the resin.

8. The laminate material of claim 6, wherein the finishing layer is a polyurethane resin based layer.

9. A process for the preparation of the reinforced laminate material of claims 6, 7 or 8 comprising:
(i) applying or forming a first layer onto a support film or mold to constitute the said finishing layer;
(ii) applying heat to said finishing layer and allowing said finishing layer to harden partially;
(iii) depositing a second layer which is said composition comprising an ethylenically unsaturated polyester resin and a cross-linking solvent of said resin, wherein at least one of the components of said composition bears hydrophilic sites in a number which is at least equal to the number of unsaturation sites of the polymeric chain of the polyester resin;
(iv) applying heat to said second layer and allowing said second layer to harden partially;
(v) forming on said partially hardened second layer a laminate of several successive alternating layers of a reinforcement and of a phenolic resin mixed with its acid cross-linking catalyst;
(vi) heat-hardening the phenolic resin; and
(vii) removing the film or mold from the reinforced laminate material obtained.

10. A process for the preparation of the reinforced laminate material of claim 1, comprising:
(i) applying the said composition to a continuously feeding support film or mold, to form a layer, said composition comprising an ethylenically unsaturated polyester resin and a cross-linking solvent of said resin wherein at least one of the the components of said composition bears hydrophilic sites in a number which is at least equal to the number of unsaturation centers of the polymeric chain of the polyester resin;
(ii) applying heat to said layer and allowing the said layer to harden partially;
(iii) forming on said partially hardened layer a laminate of several successive alternating layers of a reinforcement and of a phenolic resin mixed with its acid cross-linking catalyst;
(iv) applying heat to said phenolic resin and allowing the phenolic resin to harden; and
(v) removing the film or mold from the reinforced laminate material obtained.

11. The procedure of claim 10, comprising depositing the formula on the support using a gun or a doctor blade, forming the laminate through contact by depositing the phenolic resin and glass fiber reinforcements, and heating slightly to complete the impregnation of the fibers by the resin before oven-hardening it.

12. The process of one of claims 11, 10 or 9 wherein the hardening of the phenolic resin is effected at about 95° C.

* * * * *